United States Patent Office.

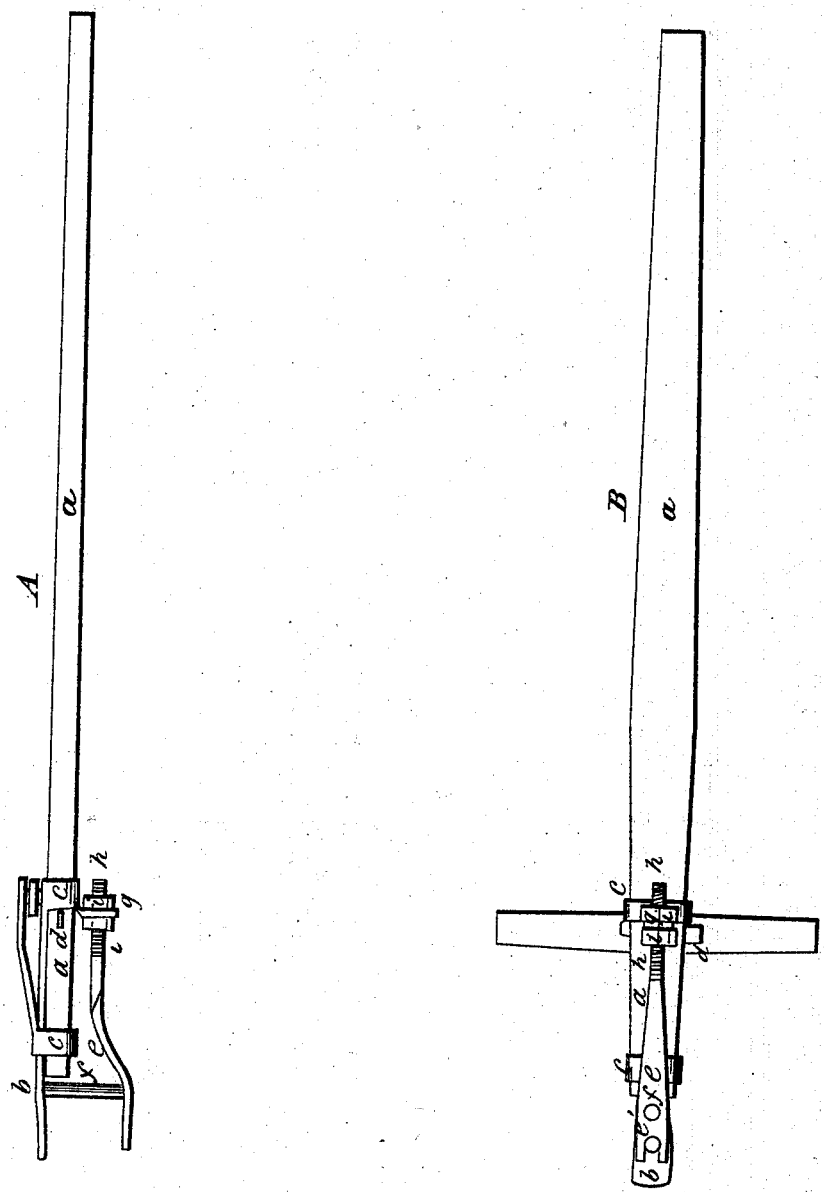

IMPROVED POLE FOR HORSE RAILWAY CARS.

DANIEL T. ROBINSON, OF BOSTON, MASSACHUSETTS.

*Letters Patent No. 60,250, dated December 4, 1866.*

SPECIFICATION.

TO ALL WHOM IT MAY CONCERN:

Be it known that I, DANIEL T. ROBINSON, of Boston, in the county of Suffolk, and State of Massachusetts, have invented an improvement in Poles of Horse Railway Cars; and I do hereby declare that the following, taken in connection with the drawings which accompany and form part of this specification, is a description of my invention sufficient to enable those skilled in the art to practise it.

In applying poles to horse railway cars, it is customary to fasten the pole to the platform by a loose coupling bolt, passing through a coupling plate or bar fixed to the pole, and a bolt-eye fixed to the platform, and to sustain the bolt at a proper horizontality by a brace bar extending from the under side of the pole, at a short distance from its rear end, down from the bar and back to the plane of the bolt hole, and so as to abut against and straddle a bolt or rod attached to the car platform, thereby bracing up the bar or keeping it from drawing down upon the horses. By wear of the end of the brace bar against the bolt, however, or from other causes, the pole soon sags and gets out of horizontal position. To obviate or counteract this defect or liability is the object of my invention, which consists in so connecting this brace at its rear end to the pole, that its bolt-straddling and abutting end may be adjusted or fed forward as occasion may require, to determine the position of the pole or keep it from undue sagging.

The drawings represent a pole embodying the invention; A showing a side view, and B a reversed plan of the same.

$a$ denotes the pole; $b$ the coupling or bolt-plate thereof, which is shown as applied and secured to the pole by loops, $c$ $c$, and a key, $d$. $e$ denotes the brace or pole-supporting bar, having at its forward end the slot or recess $e'$, for abutting against the stationary bolt or rod attached to the car, a strut, $f$, keeping the front ends of the brace-bar and bolt-plate in proper relative position. At or near the rear end of this brace-bar, a projection or plate, $g$, extends down from the pole, or from the rear end of the coupling plate, and through this projection the end of the brace-bar or rod passes, a screw, $h$, being formed upon the end of said rod, upon which two adjusting nuts, $i$, play, as will be readily understood. Now, it will be obvious that the position of the front end of the brace-bar may be determined and varied by means of these nuts and screw and the projection $g$, so that as the bolt-abutting slot in the brace becomes worn, or the pole, from other causes, sags down, the pole may be brought back to proper position by lowering the front nut $i$, and tightening the rear one, and that, by a little care, the proper horizontality of the pole may thus be always maintained.

I claim combining with the pole $a$, coupling plate or bar $b$, and brace rod or bar $c$, the means or mechanism for adjusting the position of this brace-bar relatively to the pole, substantially as set forth.

DANIEL T. ROBINSON.

Witnesses:
F. GOULD,
S. B. KIDDER.